United States Patent
Nakamura et al.

(10) Patent No.: US 7,441,801 B2
(45) Date of Patent: Oct. 28, 2008

(54) STEERING WHEEL EQUIPPED WITH AIRBAG DEVICE

(75) Inventors: Kengo Nakamura, Hiroshima (JP); Satoshi Nishikaji, Hiroshima (JP)

(73) Assignee: Mazda Motor Corporation (JP)

( * ) Notice: Subject to any disclaimer, the term of this patent is extended or adjusted under 35 U.S.C. 154(b) by 250 days.

(21) Appl. No.: 11/265,792

(22) Filed: Nov. 2, 2005

(65) Prior Publication Data

US 2006/0125217 A1 Jun. 15, 2006

(30) Foreign Application Priority Data

Nov. 16, 2004 (JP) ............................. 2004-331710
Aug. 3, 2005 (JP) ............................. 2005-225600

(51) Int. Cl.
B60R 21/16 (2006.01)

(52) U.S. Cl. ...................................................... 280/731

(58) Field of Classification Search .............. 280/728.3, 280/731; 74/552; 200/61.54
See application file for complete search history.

(56) References Cited

U.S. PATENT DOCUMENTS

| 5,711,588 | A | 1/1998 | Rudisill | |
|---|---|---|---|---|
| 6,062,595 | A | 5/2000 | Ha | |
| 6,211,476 | B1 * | 4/2001 | Edie | 200/61.08 |
| 6,312,012 | B1 * | 11/2001 | Bohn et al. | 280/731 |
| 2002/0135163 | A1 | 9/2002 | Derrick | |
| 2002/0153712 | A1 | 10/2002 | Kreuzer et al. | |
| 2003/0209889 | A1 * | 11/2003 | Erwin et al. | 280/728.3 |

FOREIGN PATENT DOCUMENTS

| JP | 2000-118320 | | 4/2000 |
|---|---|---|---|
| JP | 2000118320 | | 4/2000 |
| JP | 2000159033 | A * | 6/2000 |
| JP | 2004-224145 | | 8/2004 |
| JP | 2004224145 | | 8/2004 |

* cited by examiner

*Primary Examiner*—Kevin Hurley
*Assistant Examiner*—Robert A. Coker
(74) *Attorney, Agent, or Firm*—Studebaker & Brackett PC; Donald R. Studebaker

(57) ABSTRACT

The illuminator constituting an indirect illumination is provided on the driver side of the switch cover of the horn switch provided at the fixed portion. Specifically, the clear acryl plate is provided on the driver side of the switch cover. On the driver side of the acryl plate is provided the mask portion coated with black paint, while on its vehicle-front-side surface is provided the reflecting portion with coated white paint. The LEDs are provided behind the mask portion and inside the acryl plate. The mask portion constitutes the emblem of vehicle makers, and the emblem portion shines when the LEDs are tuned on. Thus, the visible function of the operational portion (switch cover), which is provided at the fixed portion can be improved.

18 Claims, 8 Drawing Sheets

STEERING WHEEL EQUIPPED WITH AIRBAG DEVICE

BACKGROUND OF THE INVENTION

The present invention relates to a steering wheel equipped with an airbag device operative to protect a vehicle driver at a vehicle crash. In particular, the present invention belongs to technology of a specific structure in which an operational portion to operate a vehicle on-board device or the like is provided at a pad portion of the steering wheel.

Conventionally, it is known that the airbag device is provided at the steering wheel to properly reduce an impact that the driver receives at the vehicle crash. Herein, the airbag device is provided in the pad portion of the steering wheel and it inflates an airbag cushion toward the driver when the crash is detected.

It is also known that at the pad portion of the steering wheel equipped with the airbag device are provided an operational portion to operate a vehicle on-board device, such as a horn switch, and/or an indicator of a liquid crystal panel, and that the airbag cushion is disposed so as to be inflated avoiding the operational portion and like. For example, U.S. patent application Publication No. 2002/0135163 A1 discloses the steering wheel in which the airbag cushion is accommodated in a ring shape around the center of the pad portion where the above-described operational device and the like are provided. Herein, at the pad portion are formed some tear lines extending in the radial direction from the center, so that a cover portion of the pad portion can open along the tear lines when the airbag cushion is inflated, leaving the center portion, which constitutes a fixed portion of the pad portion (hereinafter, this airbag is also referred to as a doughnut-shape airbag).

In the steering wheel equipped with such a doughnut-shape airbag, the center portion of the pad portion does not open as the fixed portion, where the above-described operational portion and the like are provided, when the airbag cushion is inflated. Accordingly, the airbag cushion is inflated, avoiding the liquid crystal panel disclosed in the above-described publication or the horn switch disclosed in Japanese Patent Application Laid-Open No. 2004-224145, and thereby the proper inflation of the airbag cushion can be endured and the switch and the like can be prevented from interfering with the driver during the inflation of the airbag cushion.

Meanwhile, it is also known that at the pad portion of the steering wheel are provided an emblem of automotive vehicle makers or the like and that the emblem is constituted so as to be illuminated to improve ornamental function and advertising function (see Japanese Patent Application Laid-Open No. 2000-118320, for example).

Herein, in the case where the above-described doughnut-shape airbag is provided and at the fixed portion of the pad portion of the steering wheel are provided the horn switch or the like, the operational function of such switches can be improved. However, since the driver's eyes tend to be turned downward, the visible function of the switches seems not necessarily appropriate. In particular, it would be difficult for the driver to properly conduct the operation of switches in case of emergency at night.

SUMMARY OF THE INVENTION

The present invention has been devised in view of the above-described problem, and an object of the present invention is to provide a steering wheel equipped with an airbag device in which the airbag cushion is inflated from the pad portion in the doughnut shape, which can improve the visible function of the operational portion, such as a horn switch.

Namely, the present invention is a steering wheel equipped with an airbag device, comprising a peripheral ring portion to be griped by a driver, a center pad portion coupled to the ring portion via a spoke portion, and an airbag device disposed in the pad portion, the airbag device being operative to inflate an airbag cushion, which is accommodated in a ring shape, toward the driver at a vehicle crash, wherein the pad portion includes a fixed portion that does not open according to the inflation of the airbag cushion and an open portion that is disposed around the fixed portion and opens according to the inflation of the airbag cushion, and at the fixed portion of the pad portion are provided an operational portion to operate a vehicle on-board device and an illuminator operative to illuminate the operational portion.

Accordingly, in the steering wheel in which the airbag cushion is inflated from the pad portion in the doughnut shape at the vehicle crash, since the operational portion and the illuminator for the operational portion are provided at the fixed portion of the pad portion, the visible function of the operational portion, which is provided at the fixed portion that is located below the driver's sight during a vehicle traveling and which has relatively small area, can be improved and thereby the operational function of the operational portion can be improved properly even at night.

Also, since the illuminator is provided at the fixed portion that does not open according to the inflation of the airbag cushion, various types of illumination, such as an indirect illumination, are applicable, thereby enhancing flexibility in illumination designing.

According to a preferred embodiment of the present invention, a horn switch is provided at the fixed portion of the pad portion, and a switch cover of the horn switch substantially constitutes the operational portion. Thus, since the horn switch is provided at the fixed portion where the illuminator is provided, the visible function of the horn switch can be improved even at night and, thereby the horn can be surely generated even in case of emergency.

According to another preferred embodiment of the present invention, a horn switch is provided behind the open portion of the pad portion, and a member operative to be pushed by the driver and to transmit a pushing force of the driver to the horn switch substantially constitutes the operational portion. Thus, in a type of horn switch device in which the horn switch is provided behind the open portion disposed around the fixed portion of the pad portion of the steering wheel, the airbag cushion is not accommodated in the fixed portion and the illuminator is provided so as to illuminator the fixed portion where the member to push for operating the horn. Accordingly, the visible function of the member that is provided at the fixed portion so as to operate the horn can be improved. As a result, the operational function of the horn switch device can be improved.

According to another preferred embodiment of the present invention, the illuminator includes a clear plate that is disposed on a driver side and a light emitter to illuminate the clear plate. Herein, it is preferable that on a surface of the clear plate is formed a recess portion that reflects a light emitted by the light emitter. Thus, the clear plate is illuminated by the light emitter, and the visible function of the fixed portion can be properly ensured even at night. Further, since the light from the light emitter are reflected and thereby diffused by the recess portion formed on the surface of the clear plate, the quantity of light that reaches the driver is reduced and thereby the forward visible function of the driver can be prevented from being impaired by the light from the illuminator. Also, the illuminated portion looks three-dimensional because of the recess portion of the clear plate, and thereby the high-grade ornamental effect can be obtained.

According to another preferred embodiment of the present invention, the illuminator constitutes an indirect illumination in which a directly emitted light does not come in a sight of the driver. In general, in the case where the direct illumination device is provided at the pad portion of the steering wheel near the driver, there is a concern that the quantity of light is so intensive that the frontward visible function of the driver would be impaired. However, the above-described indirect illumination can properly adjust the quantity of light, so that the forward visible function of the driver can be prevented from being impaired. The mild light emitted by the indirect illumination can also provide the high-grade ornamental effect.

According to another preferred embodiment of the present invention, the illuminator includes a clear plate that is disposed on a driver side, a base portion that is disposed behind the clear plate and provided at the fixed portion, and a light emitter that is disposed between the clear plate and the base portion, the clear plate having a mask portion constituting an non-emblem portion on a face thereof that is on an opposite side to the driver side, the light emitter being constituted so as to emit the light on a driver-side surface of the base portion or to emit the light on an emblem portion enclosed by the non-emblem portion. Thus, since the light emitter is disposed between the clear plate and the base portion, the thickness of the clear plate disposed on the driver side can be properly designed regardless of the disposition of the light emitter. Accordingly, the sufficient rigidity of the clear plate can be maintained and thereby the clear palate can be surely prevented from being damaged or broken when the airbag cushion is inflated.

According to another preferred embodiment of the present invention, on the driver-side face of the base portion is provided a reflecting portion with a bright color, and the light emitter is disposed behind the mask portion such that the light directly emitted by the light emitter does not come in the sight of the driver. Thus, the forward visible function of the driver can be prevented from being impaired with the indirect illumination as described above.

According to another preferred embodiment of the present invention, the illuminator includes a first clear plate that is disposed on the driver side and a second clear plate that is disposed behind the first clear plate, a mask portion constituting an non-emblem portion is provided on a surface of the first clear plate that is on the opposite side to the driver side or on a surface of the second clear plate that is on the driver side, and the light emitter is provided at the second clear plate. Thus, since the light emitter is provided at the second clear plate, the thickness of the first clear plate disposed on the driver side can be properly designed as described above. Accordingly, the sufficient rigidity of the first clear plate can be maintained and thereby the first clear palate can be surely prevented from being damaged or broken when the airbag cushion is inflated, likewise.

According to another preferred embodiment of the present invention, there is provided the base portion that is provided at the fixed portion behind the second clear plate, on the driver-side surface of the base portion is provided the reflecting portion with the bright color, and the light emitter is disposed behind the mask portion such that the light directly emitted by the light emitter does not come in the sight of the driver. In this case, the forward visible function of the driver can be prevented from being impaired with the indirect illumination, likewise.

According to another preferred embodiment of the present invention, there is provided the base portion that is provided at the fixed portion behind the second clear plate, the first and second clear plates are provided so as to substantially contact each other, and the second clear plate is fixed to the base portion. Accordingly, the first and second clear palates can be surely prevented from being damaged or broken when the airbag cushion is inflated.

According to another preferred embodiment of the present invention, a filter portion is provided at an emblem portion enclosed by the mask portion, whereby the quantity of light passing through the filter portion toward the driver is reduced. Thus, the forward visible function of the driver can be prevented from being impaired.

According to another preferred embodiment of the present invention, the illuminator includes the clear plate that is disposed on the driver side, the base portion that is disposed behind the clear plate, and the light emitter that is disposed at the base portion, the clear plate having the recess-shape groove portion constituting the emblem portion on a surface thereof that is on the opposite side to the driver side, the light emitter being constituted so as to emit the light to the clear plate. Accordingly, the forward visible function of the driver can be prevented from being impaired, and the clear plate at which the light emitter is provided can be surely prevented from being damaged or broken when the airbag cushion is inflated.

According to another preferred embodiment of the present invention, the base portion includes a base body to cove the clear plate and a projecting portion to project from the base body toward the driver side so as to enclose the clear plate, and the light emitter is provided in the projecting portion so as to emit the light to the clear plate from the side. Accordingly, since the light emitted by the light emitter is prevented from coming in the sight of the driver, the forward visible function of the driver can be prevented from being impaired. Also, the high-grade ornamental effect can be obtained.

Other features, aspects, and advantages of the present invention will become apparent from the following description which refers to the accompanying drawings.

DETAILED DESCRIPTION OF THE INVENTION

Hereinafter, some embodiments of the present invention will be described referring to the accompanying drawings. The following just exemplifies preferred embodiments and should not limit applications and uses of the present invention.

EMBODIMENT 1

Figure 1:
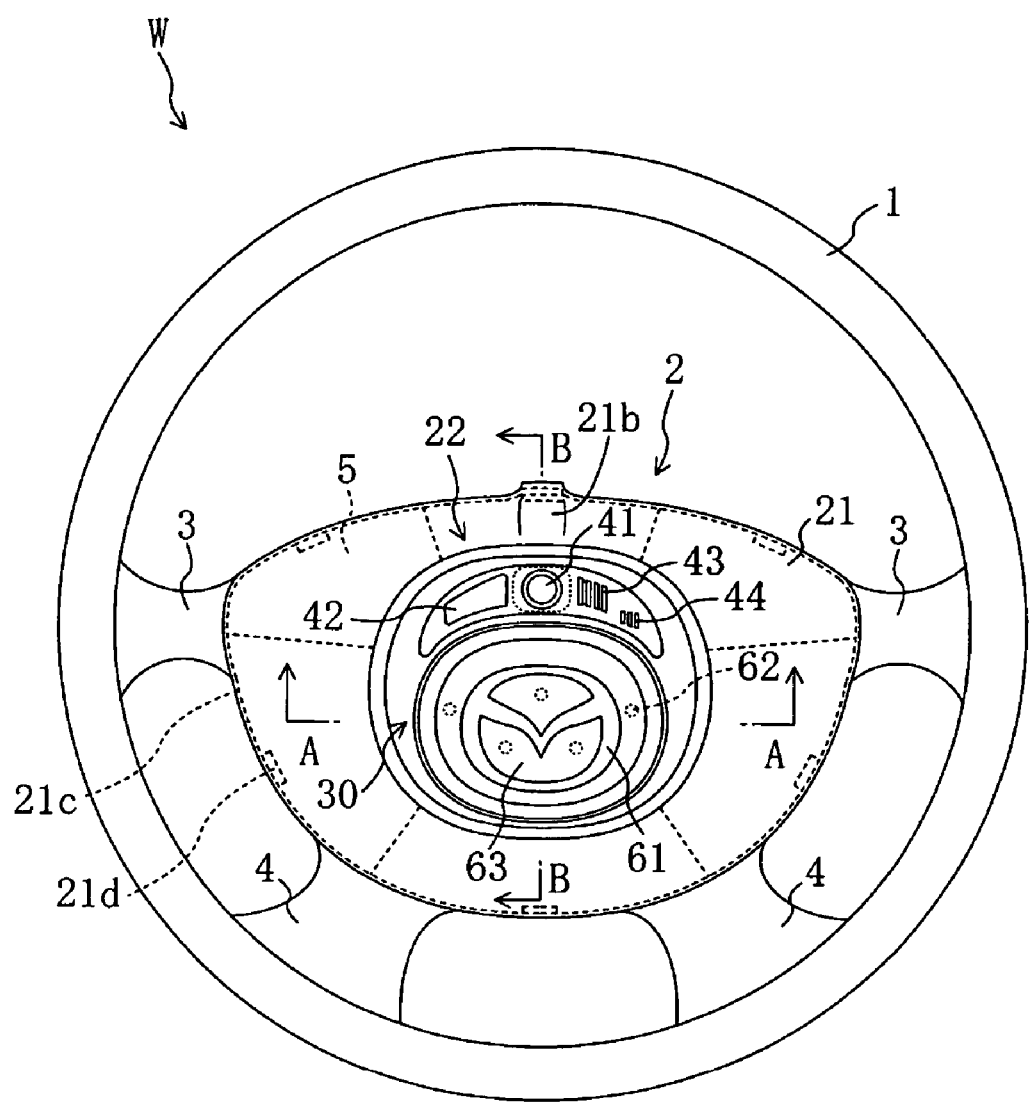
FIG. 1 is an elevation view illustrating a schematic structure of a steering wheel according to the first embodiment of the present invention.
Figure 2:
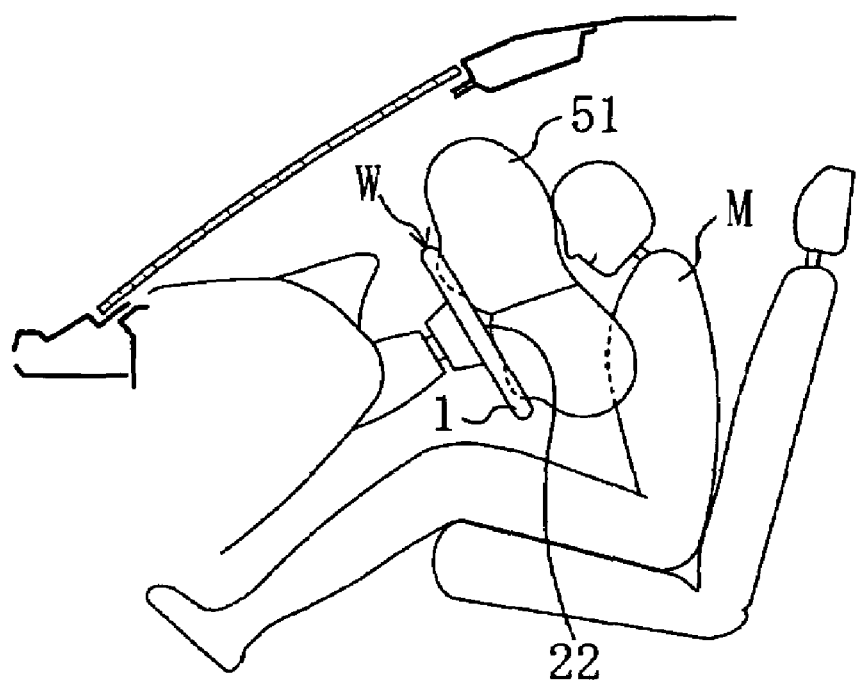
FIG. 2 is a diagram illustrating a state in which an airbag cushion disposed in the steering wheel has been inflated.

FIG. 1 illustrates a schematic structure of a steering wheel W equipped with an airbag device according to the first embodiment of the present invention. The steering wheel W comprises a ring portion 1 that is disposed at a peripheral portion and griped by a driver M, a pad portion 2 that is located at the center of the ring portion 1, and four spokes 3, 3, 4, 4 (spoke portions) that interconnect the ring portion 1 and the pad portion 2. An airbag device 5 is disposed in the pad portion 2, and the airbag device 5 inflates an airbag cushion 51 toward the driver M at a vehicle crash as illustrated in FIG. 2. In the present embodiment, the airbag cushion 51 is a doughnut-shape airbag cushion operative to be inflated in a ring shape, which will be described below.

The spokes 3, 3, 4, 4 are, as illustrated in FIG. 1, comprised of a pair of lateral spokes 3, 3 that extend from upper side ends of the pad portion 2 in the vehicle width direction and a pair of oblique spokes 4, 4 that obliquely extend from lower side ends of the pad portion 2 downward. The lateral spokes 3, 3 divide a space enclosed by the ring portion 1 and the pad portion 2 of the steering wheel W into an upper part and a lower part. And, the oblique spokes 4, 4 divide the lower space into three parts further. The airbag cushion that has been inflated can come in these parts of space when the driver M hits against the airbag cushion as illustrated in FIG. 2, thereby effectively reducing an impact that the driver M receives.

Herein, the ring portion 1 and spokes 3, 3, 4, 4 are formed in such a manner that core bars are covered with covering layers that are made of synthetic resins, such as urethane. The pad portion 2 is formed in such a manner that the airbag device 5 and its core bars provided on the driver side and on an opposite side to the driver side (on the vehicle-front side) are covered with covers.

The above-described pad portion 2 is formed in a substantially reverse-trapezoid shape as illustrated in FIG. 1, and accommodates the airbag cushion 51 disposed in the ring shape. The pad portion 2 includes an open portion 21 that opens along tear groove lines provided thereon when the airbag cushion 51 is inflated, and a fixed portion 22 that does not open when the airbag cushion 51 is inflated. The open portion 21 is disposed around the fixed portion 22.

Figure 3:
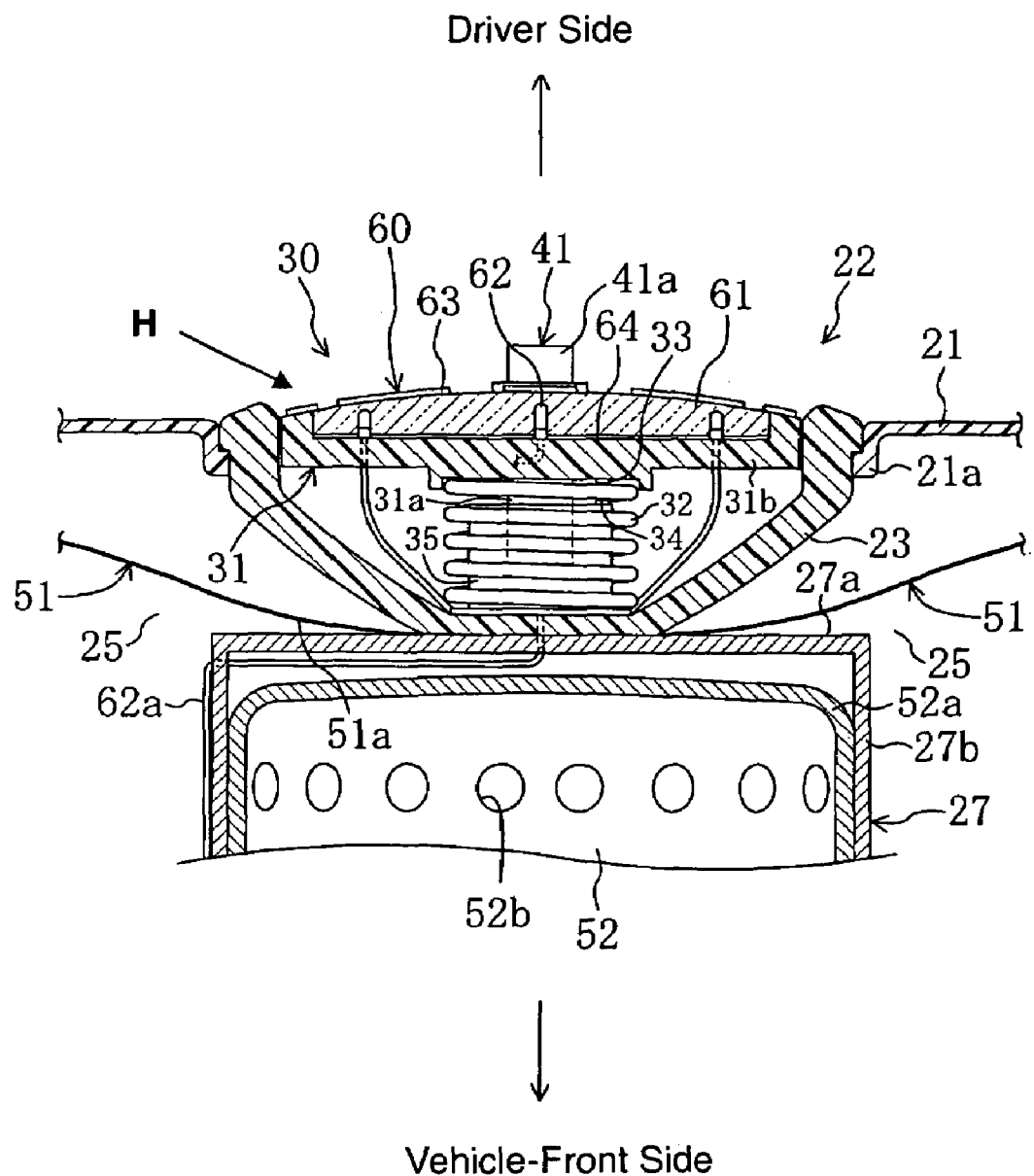
FIG. 3 is an enlarged sectional view, taken along line A-A of FIG. 1, illustrating an internal structure of a fixed portion of a pad portion of the steering wheel.
Figure 4:
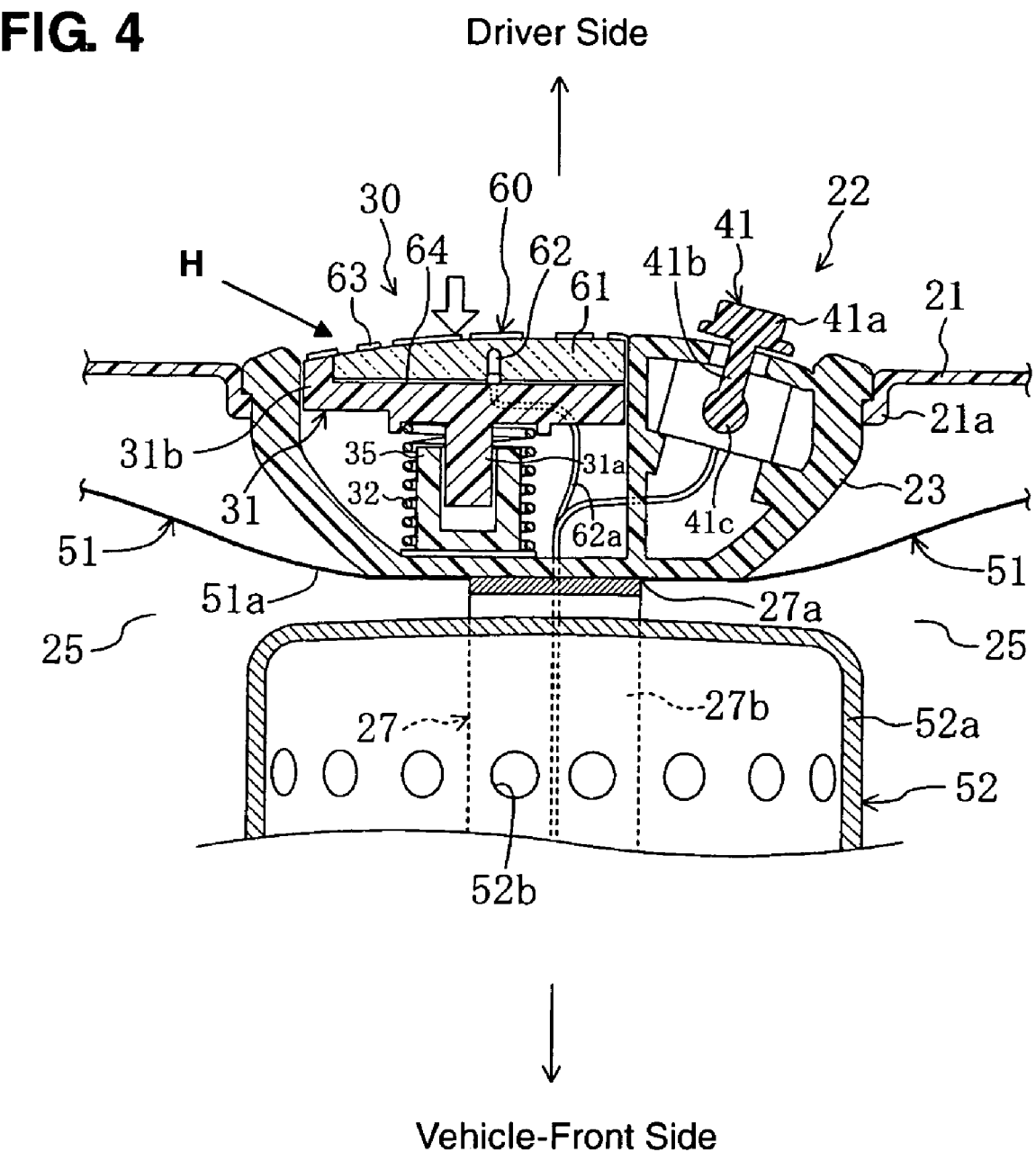
FIG. 4 is an enlarged sectional view, taken along line B-B of FIG. 1, illustrating the internal structure of the fixed portion of the pad portion.

As illustrated in FIGS. 3 and 4, a chamber 25 to accommodate the airbag cushion 51 is formed behind the open portion 21, while a substantially cylindrical inflator 52 operative to supply gas to the airbag cushion 51 is disposed behind the fixed portion 22. Namely, the chamber 25 is formed in the ring shape so as to enclose the inflator 52, and the airbag cushion 51 is folded and accommodated in the chamber 25 in the ring shape. Herein, the airbag device 5 is substantially comprised of the airbag cushion 51 and the inflator 52.

The airbag cushion 51 is formed in a bag shape. An open edge of the airbag cushion 51 on the vehicle front side is fixed to the pad portion 2 (not illustrated), while the center of a bottom portion 51a of the airbag cushion 51 is held between the fixed portion 22 of the pad portion 2 and a support bracket 27, which is described below. Thus, the airbag cushion 51 is disposed so as to cover the driver side of the inflator 52, and the center of the bottom portion 51a is fixed. And, the airbag cushion 51 is inflated in the substantially doughnut shape when the gas is supplied into it.

The inflator 51 contains a gas generator (not illustrated) to generate gas into a case 52a. By igniting the gas generator, the gas is generated, and then the gas generated is supplied to airbag cushion 51. Namely, there are provided plural gas injection holes 52b, 52b . . . at the side face of the case 52a, and since the airbag cushion 51 is disposed so as to cover the inflator 52 as described above, the gas is surely supplied to the airbag cushion 51 via the gas injection holes 52b, 52b . . . .

Also, as illustrated in FIGS. 3 and 4, a cone-shaped support member 23 is provided at the fixed portion 22 so as to open toward the driver side. A peripheral edge of the support member 23 is engaged with the above-described open portion 21. Specifically, the open portion 21 includes a through hole at the center, which is large enough to dispose the support member 23 in it. And, the peripheral edge of the support member 23 is engaged with a bent portion 21a that is formed at an inner peripheral edge of the open portion 21 so as to be bent toward the vehicle front in a crank shape.

The support member 23 at the fixed portion 22 is fixed via bolts to an upper plate portion 27a of the a support bracket 27 with a U-shaped cross section that is disposed so as to cover the driver side of the inflator 52. Open side ends of the support bracket 27 are connected and fixed to a retainer (not illustrated) that is fixed to the pad portion 2, which is not illustrated. The open end of the airbag cushion 51 is held at this connection portion. Thus, the fixed portion 22 is fixed to the pad portion 2 via the support bracket 27, and the inside portion of the airbag cushion 51 is fixed to the pad portion 2. Accordingly, the fixed portion 22 is constituted so as not to open when the airbag cushion 51 is inflated.

In the structure described above, when at the vehicle crash the gas is supplied from the inflator 52 into the airbag cushion 51 and thereby the airbag cushion 51 is inflated, only the open portion 21 of the pad portion 2 opens along the tear groove lines broken, and the airbag cushion 51 is inflated toward the driver. Herein, the fixed portion 22 remains fixed to the pad portion 2 and does not open. Also, since the inside portion of the airbag cushion 51 is fixed, the airbag cushion 51 is inflated toward the driver in the ring shape.

Further, at the fixed portion 22 on the deriver side of the support member 23 are provided a horn switch 30 that generates a horn (warning sound), an operation switch 41 to operate devices such as audio or navigation devices, a display 42 to indicate warning or the like that is made of EL, liquid crystal or the like, a speaker 43 to emit a sound for guide and the like, and a microphone 44 to recognize the driver's voice. Thus, the switches (operational portions) are provided at the fixed portion 22 located at the center of the pad portion 2, and thereby such parts can be easily operated by the driver and the operational function of those can be improved.

Herein, in order to further improve the operational function of the operation switch 41, there is provided a projection portion 21b that is located above the fixed portion 22 and that is formed of a part of the open portion 21 so as to project toward the driver side to improve the operational function of the operation switch 41, as illustrated in FIG. 1. When, for example, the driver puts his or her hand on the pad portion 2 with four fingers, except a thumb, being located along the upper edge of pad portion 2, the above-described projection portion 21b could properly guide the driver's thumb to the location of the operation switch 41. Thus, the diver may not have to visually confirm the position of the switch 41.

The horn switch 30 is constituted, as illustrated in FIGS. 3 and 4, such that a switch cover 31 (which corresponds to an operational portion H to operate a horn device as a vehicle on-board device in the present embodiment) is supported on the support member 23 via a spring 32 so as to be movable in the longitudinal direction of the vehicle (in the vertical direction when the steering wheel is disposed horizontally, wherein the vehicle front is located below, the vehicle rear is above). Thus, when the switch cover 31 is pushed toward the vehicle front (in a direction of arrow in FIG. 4), a contact 33 on a side of the switch cover 31 is in contact with a contact 34 on a side of the support member 23 (see FIG. 3), thereby generating the horn (warning sound).

Specifically, a cylindrical guide member 35 with a closed bottom is provided in the cone-shaped support member 23 so as to open toward the deriver, and a projection portion 31a, which projects toward the vehicle front, is integrally provided at the front side of the switch cover 31 so as to be movable inside the guide member 35. Also, around the guide member 35 is provided the spring 32 operative to resiliently support the switch cover 31 on the support member 23, and the contacts 33 and 34 are located on the vehicle-front side of the switch cover and the driver side of the guide member 35, respectively. Accordingly, when pushed toward the vehicle front, the switch cover 31 moves against the spring force of the spring 32. Then, the contacting of the contacts 33 and 34 makes the horn circuit closed (not illustrated), so that the horn is generated from a speaker (not illustrated). Meanwhile, when the pushing is off, the spring force of the spring 32 pushes back the switch cover 31 to its initial position.

Further, on the driver side of the switch cover 31 is provided an illuminator 60 that comprises a clear (transparent) acryl plate 61 and LEDs 62 (light emitters), which will be described below, so that the ornamental effect is enhanced and the visible function of the switch horn 30 is improved even in a dark condition at night.

The operation switch 41 is, for example, a stick-type operation switch for audio or navigation devices, which includes a cylindrical portion 41a with a hat-shaped section, an axis portion 41b extending downward, and a sphere portion 41c formed at the end, as illustrated in FIGS. 3 and 4. The operation switch 41 is disposed in such a manner that the cylindrical portion 41a projects toward the driver side from the fixed portion 22 and the axis portion 41b and the sphere portion 41c are located inside the fixed portion 22. When the cylindrical portion 41a is inclined to a specified direction, the inclination movement is transmitted to the sphere portion 41c via the axis portion 41b, and then the movement of the sphere portion 41c detected by a detection portion (not illustrated). As a result, the operation of the switch 41 by the driver is detected and its detection signal is outputted to the above-described device. Herein, the operation switch 41, display 42, speaker 43 and microphone 44 are located at the space on the driver side of the support member 23 at the fixed portion 22, and the location space is separated from a space for the horn switch 30.

Next, the structure and operation of the illuminator 60 provided at the switch cover 31 of the horn switch 30, which constitutes the features of the present invention, will be specifically described referring to FIGS. 3 and 4.

The clear acryl plate 61 is provided on the driver side of the switch cover 31 of the horn switch 30 so as to cover the base portion 31b of the switch cover 31. And, on the driver side of the acryl plate 61 is provided a mask portion 63 where light-intercept paint is coated, so that the emblem of vehicle maker's name or the like appears clearly. Namely, as illustrated in FIG. 1, part of the surface of the acryl plate 61 where no light-intercept paint is coated is exposed to the driver side, where the emblem of vehicle maker's name or the like appears. Meanwhile, bright color paint of white or silver is coated on the deriver-side surface of the base portion 31b of the switch cover 31, i.e., on the contacting surface with the acryl plate 61, thereby forming a reflecting portion 64 to reflect lights toward the driver side. Herein, the reflecting portion 64 may be formed on the vehicle-front-side surface of the acryl plate 61.

Also, the LEDs 62 are provided within the acryl plate 61, to which the electricity is supplied via harnesses and which are tuned on and off by a control device on board (not illustrated). Herein, the LEDs 62 may be turned on and off along with ON/OFF operations of vehicle front lamps, vehicle side lamps, or room lamps.

When the LEDs 62 are turned on by the control device, the lights from the LEDs 62 are reflected in the acryl plate 61. The reflected lights leak toward the driver side, going through the portion without the above-described paint, i.e., the emblem portion, thereby making the emblem portion appear brightly and clearly. Herein, it is preferable that the LEDs 62 are located behind the mask portion 63 coated by a light-intercept paint so as to constitute an indirect illumination in which directly emitted lights without reflection by the reflecting portion 64 does not come in a sight of the driver. Also, it is preferable that the LEDs 62 are provided at plural positions so that the entire of the emblem portion can appear brightly and clearly (at five positions in the present embodiment as illustrated in FIG. 1).

The illuminator 60 comprises the clear plate 61 made of, for example, the acryl plate, to cover the driver side of the base portion 31b of the switch cover 31 that is provided at the fixed portion 22 of the pad portion 2; the mask portion 63 with, for example, the paint to cover part of the surface of the clear plate 61; and the light emitters 62 made of, for example, the LED, to emit the lights and diffuse the lights passing through the portion without the paint coated.

Also, there are provided codes 62a to supply the electricity to the LEDs 62 so as to extend toward the vehicle front within the fixed portion 22 as illustrated in FIGS. 3 and 4. Namely, the codes 62a extending to the bottom of the cone-shaped support member 23 go through holes at the support member 23 and the support bracket 27, and they are provided along the vehicle-front-side face (lower face in the figure) of the upper plate portion 27a of the support bracket 27. Then, the codes 62a go through a through hole formed at a side plate portion 27b of the support bracket 27, and they are provided along the side plate portion 27b so as to extend toward the vehicle front. Then, the codes 62a extend to the control device, passing inside a steering shaft (not illustrated) located behind the pad portion 2. In this way, the codes 62a are provided in the fixed portion 22, not in the open portion 21. Accordingly, the codes 62 do not prevent the airbag cushion 51 from being inflated properly. Herein, it is preferable that codes of the LED, operation switch 41 and like are also bundled up at the through holes and provided to the control device as described above.

The illuminator 60 is controlled by the above-described control device during the vehicle traveling such that the quantity of lights that reach the driver's eye from the illuminator 60 is smaller than the quantity of lights that reach the driver's eye from a meter illuminating device for illuminating a meter at an instrument panel of the vehicle. Thereby, the forward visible function of the driver can be prevented from being impaired by the lights from the illuminator 60 disposed at the pad portion 2, and the safety can thus be ensured.

Herein, the illuminator 60 may be controlled so that the illumination can function differently in case of emergency (when the vehicle crash is predicted, an auto-braking is conducted, or an unusual condition is detected, etc.) than in the normal condition. Namely, with increasing of the quantity of lights of illumination, flashing or the like, the driver may be warned highly in case of emergency. Thus, the driver can be properly warned in a closer position, and thereby the safety can be improved.

As described above, since both the switch cover 31 (the operational portion H to operate the horn device as the vehicle on-board device) of the horn switch 30 and the illuminator 60 to illuminate the switch cover 31 are provided at the fixed portion 22 of the pad portion 2 of the steering wheel W that does not open the according to the inflation of the airbag cushion 51, the visible function of the switch cover 31 of the horn switch 30 can be improved. Thus, even in case of emergency, the switch cover 31 of the horn switch 30 can be surely operated. Further, since the horn switch 31 is provided at the fixed portion 22 that does not accommodate the airbag cushion 51, the airbag cushion 51 does not interfere with the driver's pushing operation, thereby providing the prompt horn generation.

Also, since the illumination for the switch cover 31 of the horn switch 30 is the indirect illumination in which the emblem portion is illuminated indirectly, the quantity of lights are appropriate and thereby the forward visible function of the driver may not be impaired. Thus, the safety at the vehicle traveling can be ensured and the high-grade ornamental effect can be obtained.

MODIFIED EMBODIMENT 1 OF THE EMBODIMENT 1

Figure 5:
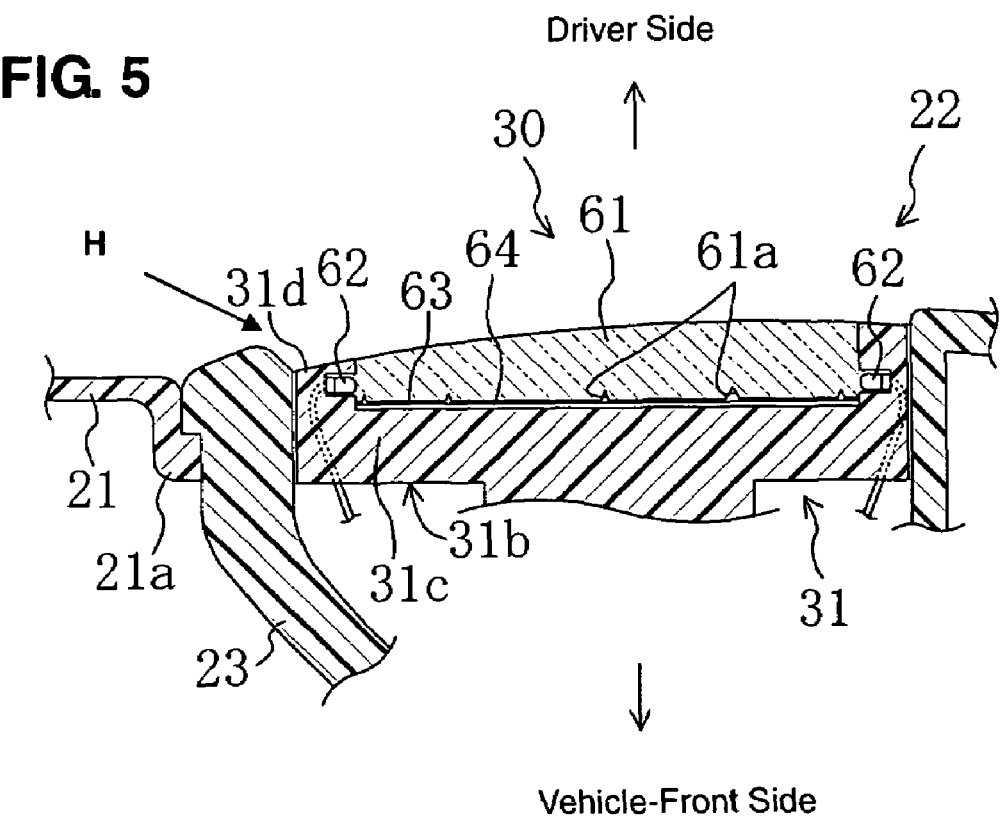
FIG. 5 is a partially enlarged sectional view of an example of an illuminator provided at a switch cover of a horn switch.

The above-described illuminator 60 is not limited to the above-described first embodiment in which the light-intercept paint is coated on the driver-side surface of the clear acryl plate 61 and the coated portion is illuminated by the LEDs 62. For example, as illustrated in FIG. 5, a plurality of groove portions (recess portions) 61a, 61a, . . . may be formed on the vehicle-front-side surface of the acryl plate 61, and the groove portions 61a, 61a, . . . may be illuminated by the lights from the side.

Specifically, on the vehicle-front-side surface of the acryl plate 61 that is provided on the driver side of the switch cover 31 of the horn switch 30 are formed the plural groove portions 61a, 61a, . . . that have substantially a V-shaped section. Thus, plural spaces with V-shaped sections are formed between the acryl plate 61 and the base portion 31b of the switch cover 31.

Also, dark-color-based paint of black or the like is coated on portions without the groove portions 61a, 61a, . . . of the vehicle-front-side surface of the acryl plate 61, so that the mask portion 63 like the first embodiment is formed. Meanwhile, bright color paint of white or silver is coated on the driver-side surface of the base portion 31b of the switch cover 31, so that the reflecting portion 64 is formed. Thereby, the portion with the groove portions 61a, 61a, . . ., namely the emblem portion looks like rising up.

The LEDs 62, 62 are provided in the base portion 31b so as to illuminate the acryl plate 61 from the side. Namely, the base portion 31b includes a base body 31c to cove the acryl plate 61 and a projecting portion 31d to project from the base body 31b toward the driver side so as to enclose the acryl plate 61, and the LEDs 62, 62 are provided in the projecting portion 31d so as to emit the light to the acryl plate 61 from the side. Thus, the lights coming in the acryl plate 61 from the side is reflected by the groove portions 61a, 61a, . . . formed at the acryl plate 61, so that the groove portions 61a, 61a, . . . look bright and three-dimensional to the driver side.

Thereby, since there is provided the indirect illumination to prevent the light emitted by the LEDs 62, 62 from coming in a sight of the driver, the forward visible function of the driver can be prevented from being impaired. Also, the visible function of the horn switch 30 can be improved and the high-grade ornamental effect can be obtained.

Also, since the LEDs 62, 62 are disposed at the base portion 31b, not at the acryl plate 61, there is no need to form any holes for the LEDs 62, 62. Accordingly, the sufficient rigidity of the acryl plate 61 can be obtained and the acryl plate 61 can be prevented surely from being broken by the airbag inflating pressure.

Herein, the inside face of the groove portions 61a, 61a, . . . may be formed in a rough-surface state, instead of a smooth-surface state. This rough-surface-state forming makes the groove portions 61a, 61a, . . . shine with a milk-white color for the white LEDs, or with a reddish milk-white color for the red LEDs. Thus, the high-grade ornamental effect may be obtained.

MODIFIED EMBODIMENT 2 OF THE EMBODIMENT 1

Figure 6:
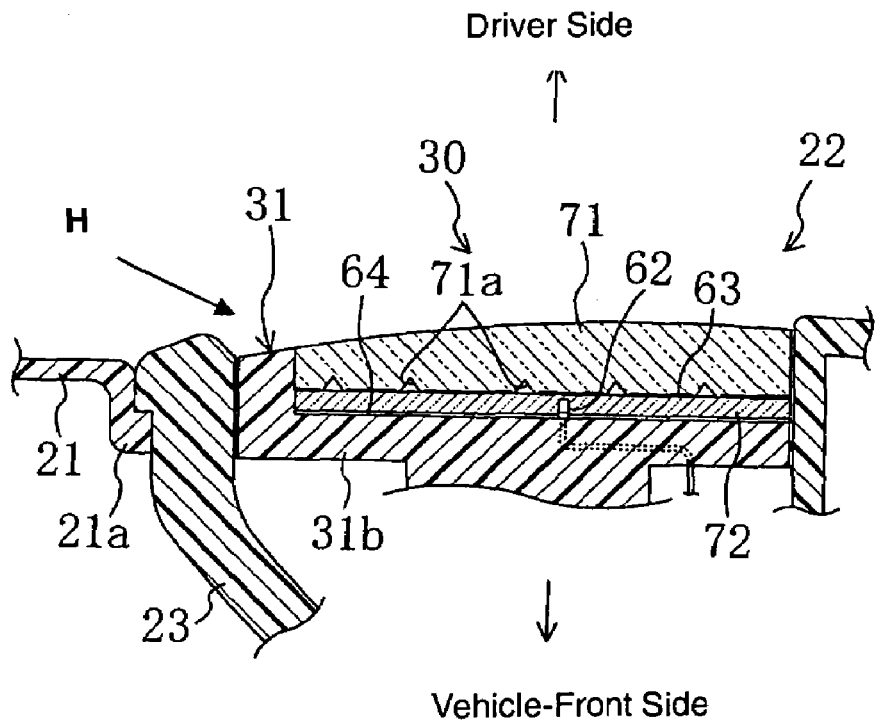
FIG. 6 is a partially enlarged sectional view of another example of the illuminator provided at the switch cover of the horn switch.

The above-described illuminator 60 is not limited to the above-described first modified embodiment in which the groove portions 61a, 61a, . . . are formed on the vehicle-front-side surface of the acryl plate 61 and the groove portions 61a, 61a, . . . are illuminated by the LEDs 62 from the side. For example, as illustrated in FIG. 6, two acryl plates 71 and 72 may be provided, spaces with substantially V-shaped section may be formed between them, and the spaces may be illuminated by the lights from vehicle front side.

Specifically, on the vehicle-front-side surface of the acryl plate 71 (the first clear plate) that is provided on the driver side are formed plural groove portions 71a, 71a, . . . that have substantially the V-shaped section. Also, dark-color-based paint of black or the like is coated on portions without the groove portions 71a, 71a, . . . of the vehicle-front-side surface of the acryl plate 71, so that the mask portion 63 is formed. Meanwhile, the bright color paint of white or silver is coated on the driver-side surface of the base portion 31b of the switch cover 31, so that the reflecting portion 64 is formed. Thereby, the portion with the groove portions 71a, 71a, . . ., namely the emblem portion looks like rising up.

A hole is formed on the vehicle-front-side surface of the acryl plate 72 (the second clear plate) and a portion behind the mask portion 63. The LED 62 is disposed in this hole so that the space portions formed by the groove portions 71a, 71a, . . . are illuminated by the light from the vehicle-front side. Herein, the minimum distance between the bottom of this hole for LED 62 and the driver-side surface of the acryl plate 72 is constituted to be shorter than that between the deepest portion of the groove portion 71a and the driver-side surface of the acryl plate 71. Thereby, the above-described space portions look three-dimensional to the driver side.

Thereby, since there is provided the indirect illumination to prevent the light emitted by the LED 62 from coming in a sight of the driver, the forward visible function of the driver can be prevented from being impaired. Also, the visible function of the horn switch 30 can be improved and the high-grade ornamental effect can be obtained.

Also, since the LED 62 is disposed in the acryl plate 72 on the vehicle front side, the sufficient rigidity of the acryl plate 71 on the passenger side can be maintained and the acryl plate 71 can be prevented surely from being broken by the airbag inflating pressure.

Herein, the inside face of the groove portions 71a, 71a, ... may be formed on the driver-side surface of the clear plate 72, instead of the vehicle-front-side surface of the clear plate 71. Also, the mask portion 63 may be formed on the driver-side surface of the acryl plate 72 on the vehicle-front side, and the reflecting portion 64 may be formed on the vehicle-front-side surface of the acryl plate 72.

Further, instead of providing the two acryl plates 71 and 72, spaces as an air layer may be formed on the vehicle-front side of the acryl plate 71 that is only provided, and the LEDs 62 may be disposed in the spaces. Thereby, since the lights from the LEDs 62 are diffused in the spaces, the diffusion of lights can be enhanced and more uniform and bright indirect illumination can be obtained. Further, by disposing the LEDs 62 in the space, there is no need to form a hole at the acryl plate 71. Thereby, the sufficient rigidity of the acryl plate 71 can be maintained and this plate 71 can be prevented from being broken at the airbag inflation.

Also, it is preferable that the two acryl plates 71, 72 are fixed to each other and the vehicle-front-side acryl plate 71 is fixed to the base portion 31b of the switch cover 31. Thus, the acryl plate 71 is fixed to the base portion 31b supported at the fixed portion 22, so the support rigidity of the acryl plate 71 can be increased. Thereby, the plate 71 can be prevented surely from being broken at the airbag inflation.

MODIFIED EMBODIMENT 3 OF THE EMBODIMENT 1

The above-described illuminator 60 is not limited to the indirect illumination in which the light emitter is not directly seen from the driver side in the first embodiment or the first or second modified embodiments that are described above. For example, as illustrated in FIG. 7, the quantity of lights may be reduced by applying some kind of magic-mirror function to the acryl plate with the emblem portion directly illuminated from the vehicle-front side (for example, by coating of a mercury film on the face of the acryl plate).

Specifically, two acryl plates 81 and 82 are provided, and on the vehicle-front-side surface of the acryl plate 81 that is provided on the driver side are formed plural groove portions 81a, 81a, ... that have substantially the V-shaped section. On the vehicle-front side of the other acryl plate 82 are provided the LEDs 62 at a location that corresponds to the groove portions 81a, 81a, .... Also, some kind of magic-mirror treatment is applied to a portion of the driver-side surface of the acryl plate 82 that corresponds to the groove portions 81a, 81a, ..., so that a magic mirror portion 83 is formed. Meanwhile, dark-color-based paint of black or the like is coated on the rest of the surface, so that the mask portion 63 is formed.

By constituting magic mirror at the portion corresponding to the groove portions 81a, 81a, ... as described above, the groove portions as the emblem portion generally look silver, which is the color of the driver side of the magic mirror when the LEDs 62 are tuned off. When the LEDs 62 are turned on, meanwhile, the emblem portion looks shining with the reduced quantity of lights from the LEDS 62. Further, the emblem portion looks three-dimensional to the driver side because of the groove portions 81a, 81a, ..., and thereby the lights from the LEDs 62 are diffused and the high-grade ornamental effect can be obtained.

Figure 7:
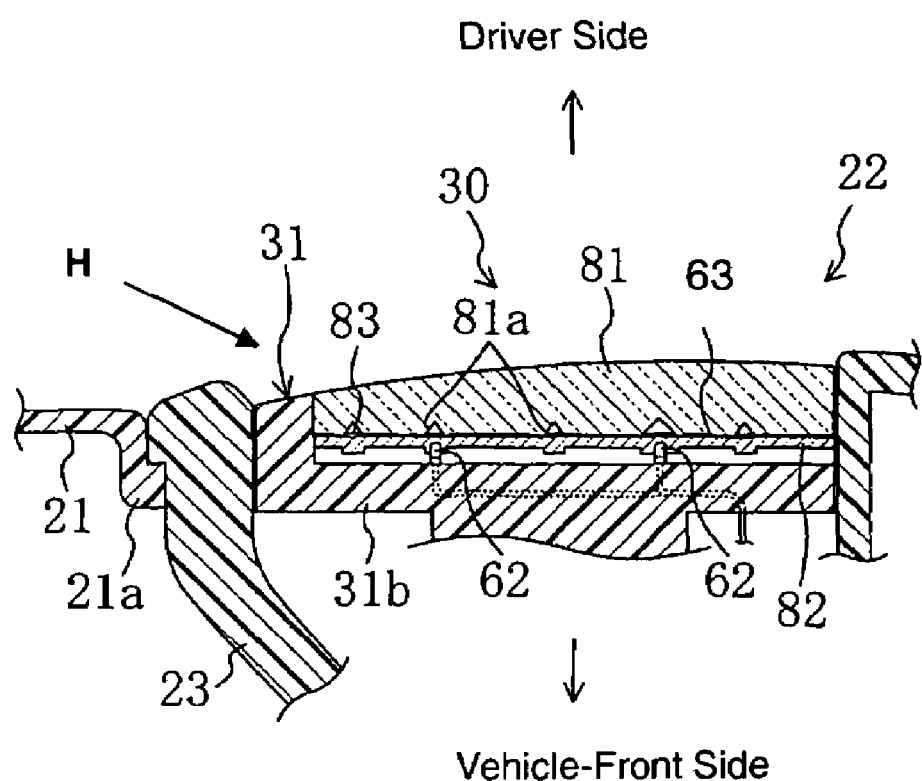
FIG. 7 is a partially enlarged sectional view of another example of the illuminator provided at the switch cover of the horn switch.

Herein, although there exits a space between the acryl plate 82 on the vehicle-front side and the base portion 31b at the switch cover 31 of the horn switch 30 in the present embodiment as illustrated in FIG. 7, the space may be filled with unclear resin or the like. Or, as shown in FIG. 8, part of the vehicle-front-side acryl plate may be extended forward and fixed to the base portion 31b.

Figure 8:
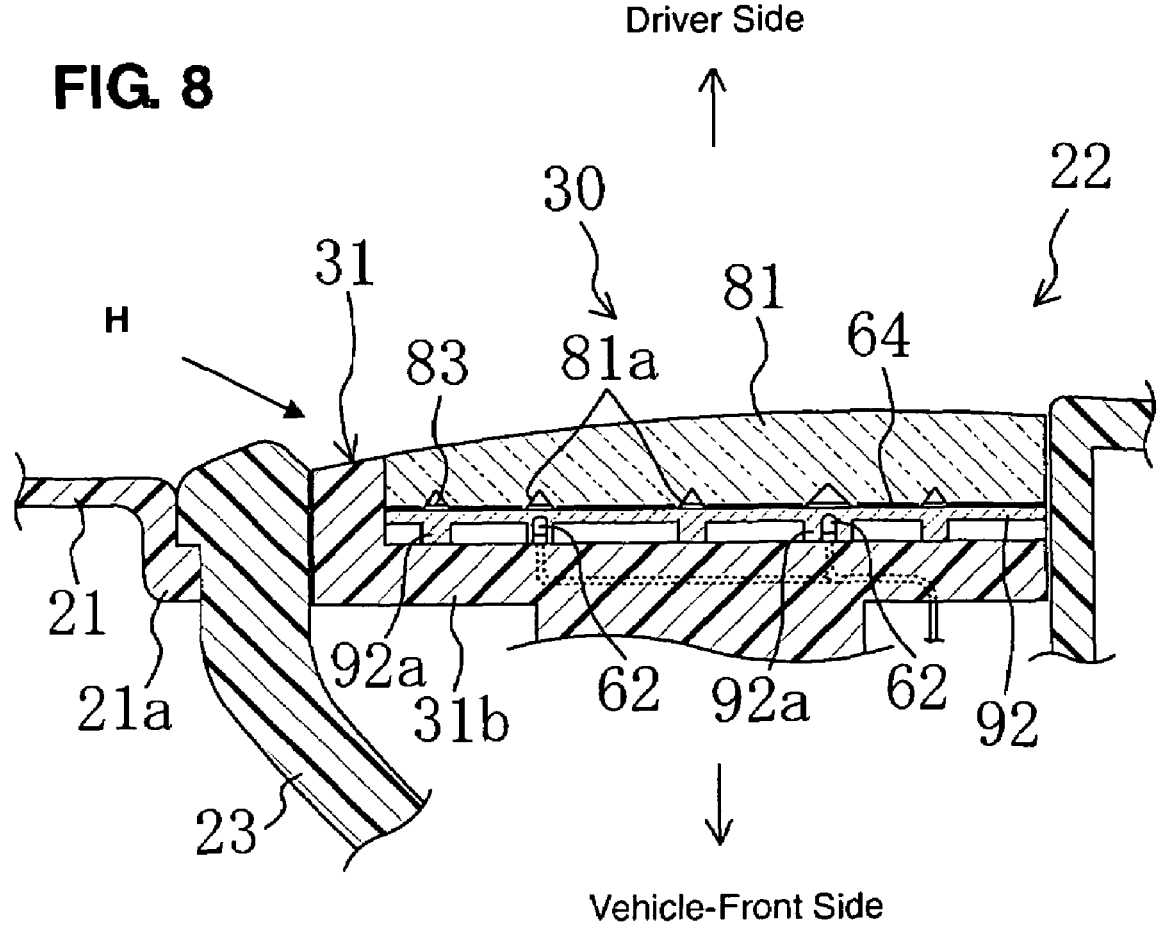
FIG. 8 is a partially enlarged sectional view of another example of the illuminator provided at the switch cover of the horn switch.

More specifically, in FIG. 8, a vehicle-front-side acryl plate 92 has a plurality of support portions 92a, 92a extending forward from its front face, by which the acryl plate 92 is fixed. Accordingly, the support rigidity of the acryl plate 92 and the acryl plate 82 can be increased, and the passenger-side acryl plate 82 can be prevented surely from being broken at the airbag inflation.

Also, although the mask portion 63 and the magic mirror portion 83 are formed at the driver-side surface of the acryl plate 82 provided on the vehicle-front side in the present embodiment, the mask portion 63 may be formed on the vehicle-front-side surface of the acryl plate 81 and the magic mirror portion 83 may be formed on the driver-side-surface of the acryl plate 82.

Further, although the above-described embodiment the emblem portion constituted of the magic mirror, any other constitution can be adopted as long as the quantity of light from the LED 62 can be properly reduced to provide the proper forward visible function of the driver. For example, paint or film may be applied to reduce the light passing.

EMBODIMENT 2

Figure 9:
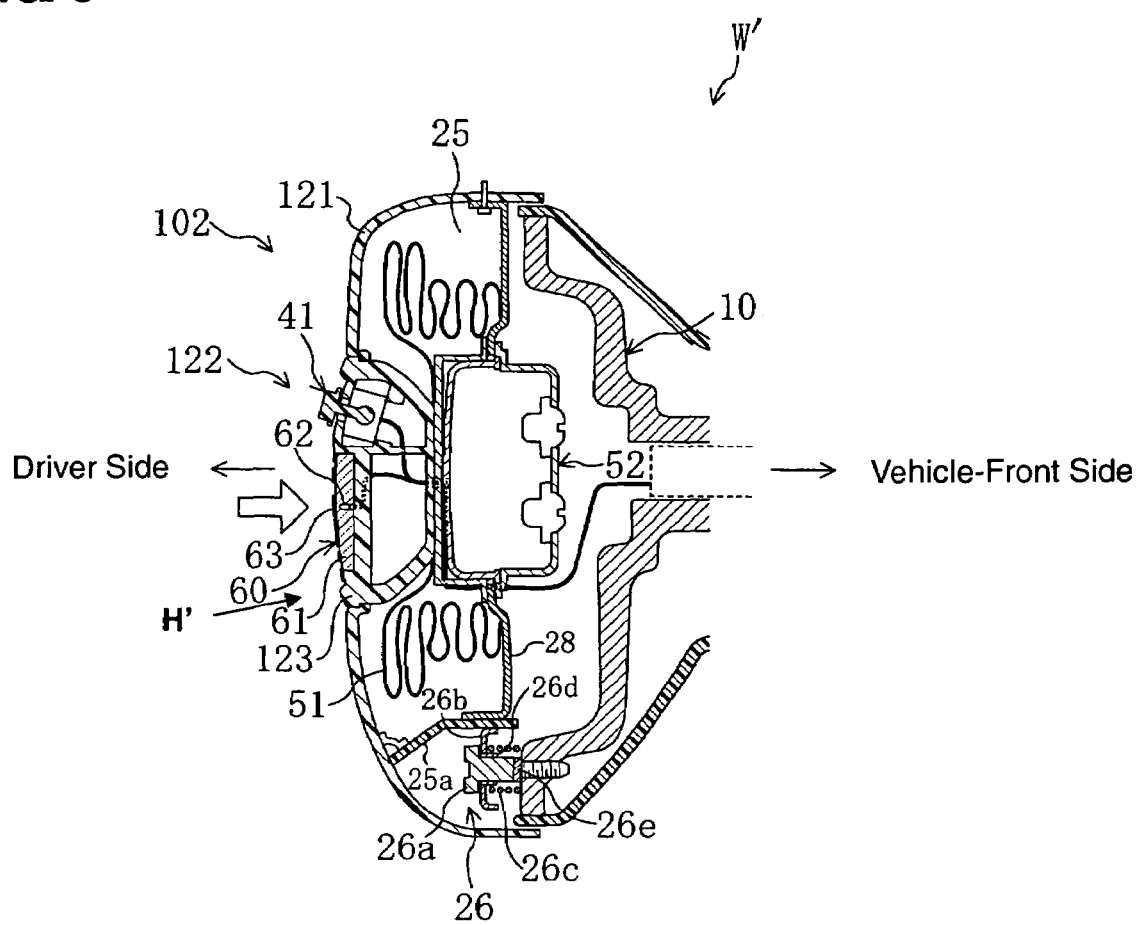
FIG. 9 is a sectional view illustrating a longitudinal section of a pad portion of a steering wheel according to the second embodiment of the present invention.

FIG. 9 illustrates a longitudinal section of the pad portion of a steering wheel W' equipped with an airbag device according to the second embodiment of the present invention. Since there is only a difference in the horn switch device structure from the first embodiment described above, the same structures are denoted by the same reference numerals as those of the first embodiment and the only different structure will be described. Namely, although the horn switch is provided at the fixed portion of the pad potion of the steering wheel in the first embodiment, in the second embodiment the horn switch is provided behind the open portion disposed around the fixed portion of the pad portion of the steering wheel.

Specifically, as illustrated in FIG. 9, the vehicle-front side of the open portion 121 is covered by a plate-shaped retainer 28, and the chamber 25 to accommodate the airbag cushion 51 is formed inside. The open portion 121 and a fixed portion 122 are resiliently coupled to a core bar 10 that is provided on the vehicle-front side via a plurality of horn switches 26 equipped with springs 26c (only one horn switch device is illustrated in FIG. 9) so as to be moveable in the longitudinal direction of the vehicle.

Thus, the pad portion 102 is constituted so as to be movable as a whole. Thereby, when the pad portion 102, specifically the fixed portion 122, is pushed toward the vehicle front (in a direction of arrow in the figure), the horn switches 26 operate to generate the horn (warning sound). Hereinafter, the structure and operation of the horn switches 26 will be described.

Each of the horn switches 26 comprises a guide axis 26a that is screwed to the core bar 10 and extends toward the driver side, a plate-shaped extension 26b that extends from a wall portion 25a, which is made of a cylindrical member with a bottom and forms part of the airbag cushion chamber 25, toward the ring portion of the steering wheel W' and through which the guide axis 26a goes, and the spring 26c that is placed around the guide axis 26c between the extension 26b and the core bar 10. Thus, the horn switches 26 resiliently support the pad portion 102 on the core bar 10.

Also, a sleeve-type contact 26d is provided at a peripheral edge of a through hole formed at the extension 26b for the guide axis 26a, and a pin-type contact 26e is provided at the guide axis 26a on the side of the core bar 10. Thereby, when the pad portion 102, specifically the fixed portion 122, is pushed toward the vehicle front (in the arrow direction in the figure), the extension 26b moves toward the vehicle front against the spring force of the spring 26c and then the contacting of the sleeve-type contact 26d with pin-type contact 26e makes the horn circuit closed (not illustrated), so that the horn is generated. Meanwhile, when the pushing force to the pad portion 102 is eliminated, the spring force of the spring 26c pushes back the pad portion 102 to its initial position.

Herein, at the pad portion 102, specifically at the driver side of the fixed portion 122, are provided the illuminator 60 to illuminate the emblem portion and the operation switch 41 to enable operation of the devices on board and the like. The structures of the illuminator 60, operation switch 41 and the like are the same as those in the first embodiment described above. Therefore, the detailed descriptions of those are omitted here (however, it is preferable in the present embodiment that the display 42 is not provided at the pad portion 2, or if provided, the display 42 has a small display area). However, the illuminator 60 is provided at the driver side of a cone-shaped support member 123 that is provided at the fixed portion 122. And, the lights from the LEDs 62 located in the clear acryl plate 61 are reflected within the acryl plate 61, and then come out toward the driver side, passing through the portion without the mask portion 63 on the driver-side surface of the acryl plate 61. For example, the mask portion 63 configures the emblem or the like, and the LEDs 62 are provided behind the mask portion 63 so as to constitute the indirect illumination.

Herein, the above-described support member 123 (which corresponds to an operational portion H' to operate the horn device in the present embodiment) is a member operative to be pushed by the driver and to transmit the pressing force of the driver to the horns switches 26.

In the present embodiment in which the horn switches 26 are provided behind the open portion 121 disposed around the fixed portion 122 of the pad portion 102, the illuminator 60 is provided at the fixed portion 122, and the airbag cushion 51 is not accommodated inside. Accordingly, the ornamental effect can be improved, and the visible function of the fixed portion 122 (where the support member 123 is provided) can be improved properly. Thus, the airbag cushion 51 does not interfere with the driver's pushing operation, and the horn can be generated promptly and surely by the driver, even in case of emergency.

Herein, the illuminator 60 of the present embodiment may be constituted in the above-described first, second and third modified embodiments of the first embodiment.

OTHER EMBODIMENTS

The present invention can include other various modifications than the above-described embodiments. Namely, although the above-described embodiments use the indirect illumination as the illuminator to illuminate the horn switch 30 at the fixed portion 22 of the pad portion 2, or the fixed portion 122, such fixed portions (emblem portion) may be directly illuminated by EL or the like. Also, the sheet-shape EL may be provided, instead of the LED 62 to correspond to the above-described embodiments, on the passenger-side surface or the side face of the base portion 31b, or the vehicle-front-side surface of the acryl plate (61, 71, 81). Thereby, since a relatively large hole for the LED 62 is not necessary to be formed, the better rigidity can be provided to the acryl plate.

Also, although the horn switch at the fixed portion 22 is illuminated with the indirect illumination in the first embodiment, the other switches provided at the fixed portion 22 may be illuminated with the indirect illumination. Further, other types of light emitter than the LED may be used (a light bulb, for example).

Also, although the groove portions are formed on the vehicle-front-side surface of the acryl plate in the first and third modified embodiments of the first embodiment, projections may be formed or the recess portion may be formed on its driver-side surface. Herein, it is necessary that the mask portion 63 is formed on either the driver-side surface or the vehicle-front-side surface of the acryl plate.

Also, in the above-described embodiments, the fixed portions 22, 122 and the open portions 21, 121 of the pad portion 2, 102 are formed separately and then attached integrally to each other as one unit by engaging the peripheral edge portion of the fixed portions 22, 122 with the bent portions 21a, 121a formed at the inner peripheral edge of the open portions 21, 121, so that the open portions 21, 121 open with disengagement of them in case of the inflation of the airbag cushion 51. However, the fixed portions 22, 122 and the open portions 21, 121 may be formed integrally, and the tear groove line may be provided between them.

Further, although the above-described embodiments use four spokes 3, 3, 4, 4 of the steering wheel W, three spokes may be used.

Any other modifications and improvements can be applied within the scope of a sprit of the present invention.

What is claimed is:

1. A steering wheel equipped with an airbag device, comprising:
   a peripheral ring portion to be griped by a driver;
   a center pad portion coupled to said ring portion via a spoke portion; and
   an airbag device disposed in said pad portion, the airbag device being operative to inflate an airbag cushion, which is accommodated in a ring shape, toward the driver at a vehicle crash,
   wherein said pad portion includes a fixed portion that does not open according to the inflation of the airbag cushion and an open portion that is disposed around the fixed portion and opens according to the inflation of the airbag cushion, and at the fixed portion of said pad portion are provided an operational portion to operate a vehicle on-board device and an illuminator operative to illuminate the operational portion,
   wherein said operational portion is disposed so as to cover a large part of the fixed portion, and said illuminator includes a single clear plate that is disposed so as to cover most part of the operational portion and a light emitter to illuminate the operational portion,
   wherein said clear plate has a mask portion that masks part of a driver-side face thereof, and said light emitter is located behind the mask portion of the clear plate so that a light directly emitted by the light emitter can be intercepted by the mask portion, whereby an indirect illumination can be constituted.

2. The steering wheel equipped with an airbag device of claim 1, wherein a horn switch is provided at said fixed portion of the pad portion, and a switch cover of the horn switch substantially constitutes said operational portion.

3. The steering wheel equipped with an airbag device of claim 1, wherein a horn switch is provided behind said open portion of the pad portion, and a member operative to be pushed by the driver and to transmit a pushing force of the driver to said horn switch substantially constitutes said operational portion.

4. The steering wheel equipped with an airbag device of claim 3, wherein said fixed portion and said open portion of the pad portion are configured so as to move backward as a whole when said horn switch is operated.

5. The steering wheel equipped with an airbag device of claim 1, wherein on a surface of said clear plate is formed a recess portion that reflects a light emitted by said light emitter.

6. The steering wheel equipped with an airbag device of claim 1, wherein said illuminator includes a base portion that is disposed behind the clear plate and provided at said fixed portion, and said light emitter is disposed between said clear plate and said base portion, said mask portion of the clear plate constituting a non-emblem portion, said light emitter being constituted so as to emit the light on an emblem portion enclosed by the non-emblem portion.

7. The steering wheel equipped with an airbag device of claim 6, wherein on a driver-side surface of said base portion is provided a reflecting portion with a bright color.

8. The steering wheel equipped with an airbag device of claim 1, wherein said light emitter is disposed within said clear plate.

9. The steering wheel equipped with an airbag device of claim 1, wherein said light emitter is disposed in a hole that is formed at said clear plate.

10. A steering wheel equipped with an airbag device, comprising:
a peripheral ring portion to be griped by a driver;
a center pad portion coupled to said ring portion via a spoke portion; and
an airbag device disposed in said pad portion, the airbag device being operative to inflate an airbag cushion, which is accommodated in a ring shape, toward the driver at a vehicle crash,
wherein said pad portion includes a fixed portion that does not open according to the inflation of the airbag cushion and an open portion that is disposed around the fixed portion and opens according to the inflation of the airbag cushion, and at the fixed portion of said pad portion are provided an operational portion to operate a vehicle on-board device and an illuminator operative to illuminate the operational portion,
wherein said illuminator includes a first clear plate that is disposed on a driver side and a second clear plate that is disposed behind the first clear plate, a mask portion constituting a non-emblem portion is provided on a surface of the first clear plate that is on an opposite side to the driver side or on a surface of the second clear plate that is on the driver side, and a light emitter is provided at said second clear plate.

11. The steering wheel equipped with an airbag device of claim 10, wherein there is provided a base portion that is provided at said fixed portion behind said second clear plate, on a driver-side surface of said base portion is provided a reflecting portion with a bright color, and said light emitter is disposed behind said mask.

12. The steering wheel equipped with an airbag device of claim 10, wherein there is provided a base portion that is provided at said fixed portion behind said second clear plate, said first and second clear plates are provided so as to substantially contact each other, and said second clear plate is fixed to said base portion.

13. The steering wheel equipped with an airbag device of claim 10, wherein a filter portion is provided at an emblem portion enclosed by said mask portion, whereby the quantity of light passing through the filter portion toward the driver is reduced.

14. A steering wheel equipped with an airbag device, comprising:
a peripheral ring portion to be griped by a driver;
a center pad portion coupled to said ring portion via a spoke portion; and
an airbag device disposed in said pad portion, the airbag device being operative to inflate an airbag cushion, which is accommodated in a ring shape, toward the driver at a vehicle crash,
wherein said pad portion includes a fixed portion that does not open according to the inflation of the airbag cushion and an open portion that is disposed around the fixed portion and opens according to the inflation of the airbag cushion, and at the fixed portion of said pad portion are provided an operational portion to operate a vehicle on-board device and an illuminator operative to illuminate the operational portion,
wherein said illuminator includes a clear plate that is disposed on a driver side, a base portion that is disposed behind said clear plate, and a light emitter that is disposed at said base portion, said clear plate having a recess-shape groove portion constituting an emblem portion on a surface thereof that is on an opposite side to the driver side, said light emitter being constituted so as to emit the light to said clear plate.

15. The steering wheel equipped with an airbag device of claim 14, wherein said base portion includes a base body to cover said clear plate and a projecting portion to project from the base body toward the driver side so as to enclose the clear plate, and said light emitter is provided in the projecting portion so as to emit the light to the clear plate from the side.

16. A steering wheel equipped with an airbag device, comprising:
a peripheral ring portion to be griped by a driver;
a center pad portion coupled to said ring portion via a spoke portion; and
an airbag device disposed in said pad portion, the airbag device being operative to inflate an airbag cushion, which is accommodated in a ring shape, toward the driver at a vehicle crash,
wherein said pad portion includes a fixed portion that does not open according to the inflation of the airbag cushion and an open portion that is disposed around the fixed portion and opens according to the inflation of the airbag cushion, and at the fixed portion of said pad portion are provided an operational portion to operate a vehicle on-board device and an illuminator operative to illuminate the operational portion, the illuminator including a clear plate and a light emitter to illuminate the operational portion,
wherein said clear plate has a recess portion on a face thereof that is on an opposite side to a driver side, and said light emitter is provided so as to emit the light to the clear plate from the opposite side, whereby the light emitted by the light emitter can be reflected by said recess portion of the clear plate so as to constitute an indirect illumination.

17. The steering wheel equipped with an airbag device of claim 16, wherein said illuminator includes a base portion that is disposed behind said clear plate, said light emitter is disposed at said base portion beside the clear plate so as to emit the light to the clear plate from the opposite side, and said recess portion constitutes an emblem portion.

18. The steering wheel equipped with an airbag device of claim 17, wherein said base portion includes a base body to cover said clear plate and a projecting portion to project from the base body toward the driver side so as to enclose the clear plate, and said light emitter is provided in the projecting portion so as to emit the light to the clear plate from the opposite side.

* * * * *